US011050780B2

(12) United States Patent
Lingafelt et al.

(10) Patent No.: US 11,050,780 B2
(45) Date of Patent: Jun. 29, 2021

(54) METHODS AND SYSTEMS FOR MANAGING SECURITY IN COMPUTING NETWORKS

(71) Applicant: INTERNATIONAL BUSINESS MACHINES CORPORATION, Armonk, NY (US)

(72) Inventors: Steven Lingafelt, Durham, NC (US); Suzanne C. Deffeyes, Weaverville, NC (US); Gary K. Thornton, Carrollton, TX (US); Amir Khan, Brookfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

(21) Appl. No.: 15/833,447

(22) Filed: Dec. 6, 2017

(65) Prior Publication Data

US 2019/0173910 A1 Jun. 6, 2019

(51) Int. Cl.
*G06F 21/00* (2013.01)
*H04L 29/06* (2006.01)

(52) U.S. Cl.
CPC ...... *H04L 63/1441* (2013.01); *H04L 63/1425* (2013.01)

(58) Field of Classification Search
None
See application file for complete search history.

(56) References Cited

U.S. PATENT DOCUMENTS

| 6,492,905 | B2 | 12/2002 | Mathias et al. |
| 7,467,410 | B2* | 12/2008 | Graham ............... H04L 63/1416 726/23 |
| 7,647,047 | B2 | 1/2010 | Moghaddam et al. |
| 8,161,552 | B1* | 4/2012 | Sun ....................... G06F 21/566 726/22 |
| 8,881,282 | B1* | 11/2014 | Aziz ...................... G06F 21/00 726/24 |
| 9,503,451 | B1* | 11/2016 | Kane-Parry ......... H04L 63/1441 |
| 9,754,109 | B1* | 9/2017 | Parker-Wood .......... G06F 21/57 |
| 2002/0112185 | A1* | 8/2002 | Hodges .................... H04L 29/06 726/23 |
| 2002/0129264 | A1* | 9/2002 | Rowland ............. H04L 63/1416 726/26 |
| 2007/0022090 | A1* | 1/2007 | Graham .................. G06F 21/55 |
| 2009/0195445 | A1 | 8/2009 | Dehaas |

(Continued)

OTHER PUBLICATIONS

Cotroneo et al., "Automated root cause identification of security alerts: Evaluation in a SaaS Cloud," Future Generation Computer Systems 56, 2016 (13 pages).

(Continued)

*Primary Examiner* — Maung T Lwin
(74) *Attorney, Agent, or Firm* — Griffiths & Seaton PLLC (57) ABSTRACT

Embodiments for managing computing network security by one or more processors are described. A signal that is representative of authorized anomalous behavior is received. The signal includes at least one of an identity and a type of activity associated with the authorized anomalous behavior. A security incident is detected. If the detected security incident corresponds to the authorized anomalous behavior, the generating of an alert in response to the detecting of the security incident is suppressed.

18 Claims, 5 Drawing Sheets

(56) References Cited

U.S. PATENT DOCUMENTS

| | | | | |
|---|---|---|---|---|
| 2012/0144020 | A1* | 6/2012 | Carey | G06Q 10/06 709/224 |
| 2012/0167162 | A1* | 6/2012 | Raleigh | H04L 41/082 726/1 |
| 2013/0340079 | A1* | 12/2013 | Gottlieb | H04L 63/1416 726/23 |
| 2015/0215335 | A1* | 7/2015 | Giuliani | H04L 63/1441 726/23 |
| 2015/0358344 | A1* | 12/2015 | Mumcuoglu | G06F 21/566 726/23 |
| 2016/0219048 | A1 | 7/2016 | Porras et al. | |
| 2017/0093918 | A1* | 3/2017 | Banerjee | H04L 63/101 |
| 2017/0099309 | A1* | 4/2017 | Di Pietro | H04L 63/1416 |
| 2017/0104773 | A1* | 4/2017 | Flacher | H04L 63/1458 |
| 2017/0279839 | A1* | 9/2017 | Vasseur | G06F 17/18 |
| 2017/0286683 | A1* | 10/2017 | Barak | G06F 11/3017 |
| 2017/0364053 | A1* | 12/2017 | Hadeli | G05B 19/406 |
| 2018/0069879 | A1* | 3/2018 | Epstein | H04L 12/2834 |
| 2018/0227322 | A1* | 8/2018 | Luo | H04L 63/1425 |
| 2019/0098032 | A1* | 3/2019 | Murphey | H04L 63/1425 |

OTHER PUBLICATIONS

Kaushik et al., "Email Feedback: A Policy-based Approach to Overcoming False Positives," ACM FMSE'05, Nov. 11, 2005 (10 pages).

Spathoulas et al., "Reducing false positives in intrusion detection systems," Computers & Security 29, 2010 (10 pages).

\* cited by examiner

METHODS AND SYSTEMS FOR MANAGING SECURITY IN COMPUTING NETWORKS

BACKGROUND OF THE INVENTION

Field of the Invention

The present invention relates in general to computing systems, and more particularly, to various embodiments for managing security in computing networks.

Description of the Related Art

In complex computing networks and systems, such as large enterprise networks with many independently operating business units, handling alerts generated by security systems (or controls) can be extremely challenging due to the wide range and complexity of activity that occurs. For instance, an employee performing security scanning of internal or external applications or devices as part of their job may generate many security alerts that can safely be ignored (i.e., false positives). As a result, accurately performing security analytics on alerting from security systems is often difficult.

Traditional "whitelisting" of known false positives (e.g., "safe" devices) is difficult to validate and maintain accurately. Additionally, traditional whitelisting often results in significant vulnerabilities by having a broad acceptance of security alerts from whitelisted devices.

SUMMARY OF THE INVENTION

Various embodiments for managing computing network security by one or more processors are described. In one embodiment, by way of example only, a method for managing computing network security, again by one or more processors, is provided. A signal that is representative of authorized anomalous behavior is received. The signal includes at least one of an identity and a type of activity associated with the authorized anomalous behavior. A security incident is detected. If the detected security incident corresponds to the authorized anomalous behavior, the generating of an alert in response to the detecting of the security incident is suppressed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, in complex computing networks and systems, such as large enterprise networks with many independently operating business units, handling alerts generated by security systems (or controls) can be extremely challenging due to the wide range and complexity of activity that occurs. Security alerts are often triggered for "ignorable" threats (i.e., false positives), which makes accurately performing security analytics on alerting from security systems difficult. For example, many security alerts may be generated by an authorized employee performing security scanning of internal or external applications or devices as part of their job.

Traditional "whitelisting" of known false positives, such as whitelisting particular vulnerability scanners, is difficult to validate and maintain accurately. On one hand, considerable resources are often utilized by investigating false security alerts. At the same time, traditional whitelisting often results in significant vulnerabilities by having a broad acceptance of security alerts from whitelisted devices. In other words, whitelisting often results in somewhat permanent, unneeded "holes" or "gaps" in some security controls, which results in reduced network security.

To address these needs, some embodiments described herein provide methods and systems for managing computing network security in which an authorized application's (and/or user's or device's) behavior and/or activity is predefined and associated with the application so that security alerts attributed to the activity are ignored (and/or suppressed) for the authorized scope of operation (e.g., for only the authorized scope of operation).

For example, in some embodiments, an endpoint agent, or application interface within an application, signals (or provides or sends a signal to) a central service (or database or security system) when an (authorized) application is about to undertake an (authorized) activity that may trigger an erroneous security alert. In some embodiments, the signal(s) is representative (or a representation) of and/or describes authorized anomalous behavior that may be observed by various security controls and includes any appropriate metadata with respect to the anomalous behavior (e.g., an identity of the entity initiating the behavior, the type of activity, the time period the anomalous behavior may occur, etc.).

The central service maintains the "current state" of both the list of devices (and/or some form of identification of an entity) that are undertaking false security alert-causing activity and the scope of their allowed activity. In some embodiments, the signal includes (and/or describes) a time frame in which the activity will take place and/or is authorized. When a security alert is generated, the central service is queried to determine if the observed manifested behavior of the specific application (or other entity) is authorized (perhaps at the specific time) to determine if the security alert is valid (and should be investigated and/or rectified) or as a result of an authorized activity.

For example, a signal may be received (and/or generated) that indicates that port scanning warnings from a particular device (e.g., 9.1.2.3) can be safely ignored for the next 10 minutes. After such a signal is received, any security monitoring, control, or analytics system (or personnel) that detects a security alert on that device may query the central system to determine whether or not that particular security alert can be safely ignored or suppressed.

As a result, the ability of security-related resources (e.g., personnel) that are responsible for monitoring network activity to focus on high priority issues is improved. That is, because of the signal received regarding the potential security threat (or incident), security-related resources are less likely to be wasted investigating, for example, someone performing a valid, authorized vulnerability scan from a laptop computer (or some other computing device). By eliminating or knowingly ignoring alerts created by authorized activities, costs related to network security may be significantly reduced.

In particular, in some embodiments, a method for managing computing network security by one or more processors is provided. A signal that is representative of and/or describes authorized anomalous behavior (or activity), which may be detected as a potential security incident, is received. The description includes, for example, a source identity and/or a type of activity associated with the authorized anomalous behavior. A security incident is detected. If the detected security incident corresponds to the description of the authorized anomalous behavior, the generating of an alert in response to the detecting of the security incident is suppressed. If the detected security incident does not correspond to the authorized anomalous behavior, an alert may be caused to be generated in response to the detecting of the security incident.

The description of the authorized anomalous behavior may include a time frame associated with the authorized anomalous behavior. If the detecting of the security incident occurs within the time frame, the generating of the alert may be suppressed. If the detecting of the security incident does not occur within the time frame, the alert may be caused to be generated.

The detecting of the security incident may include determining an identity and a type of activity associated with the detected security incident. The identity and type of activity associated with the detected security incident may be compared to the identity and type of activity associated with the description of a security incident corresponding to the authorized anomalous behavior. The identity associated with the description of a security incident corresponding to an authorized activity may include, for example, an application name or a network address.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
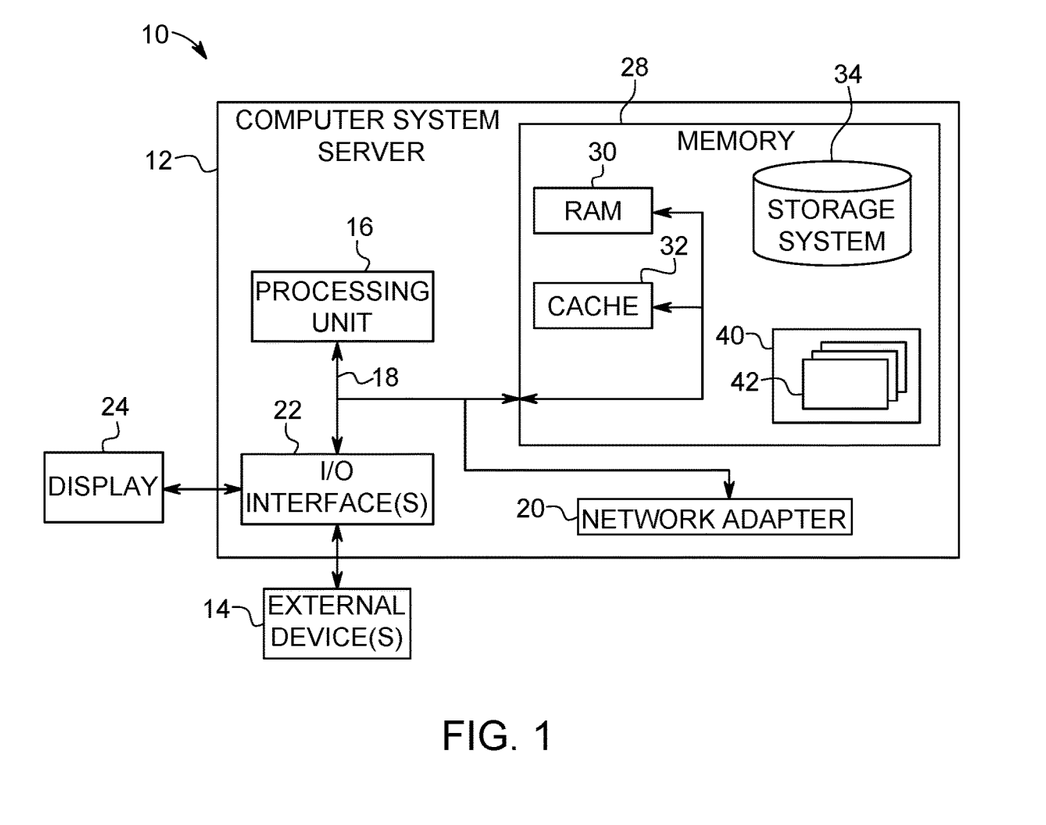
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices (e.g., mobile phones, tablets, PDAs, etc.), minicomputer systems, mainframe computer systems, and distributed cloud computing environments that include any of the above systems or devices, and the like. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
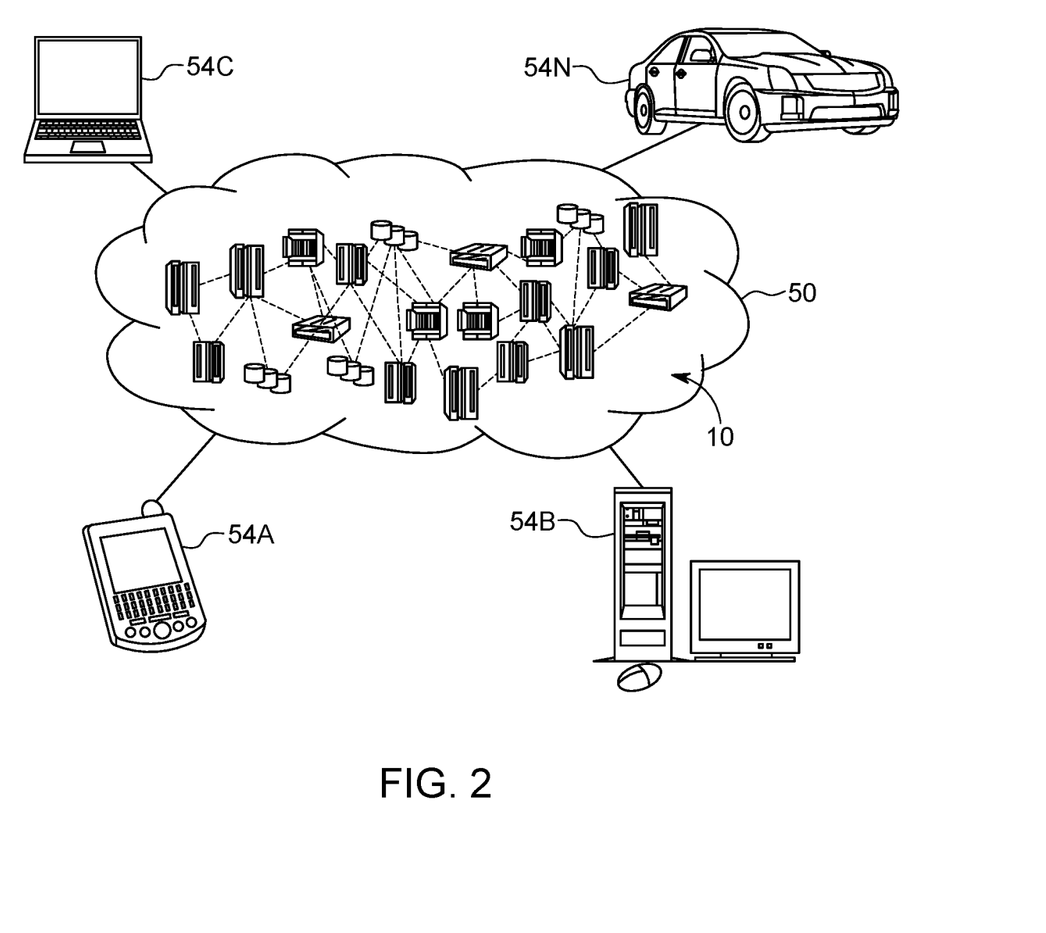
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
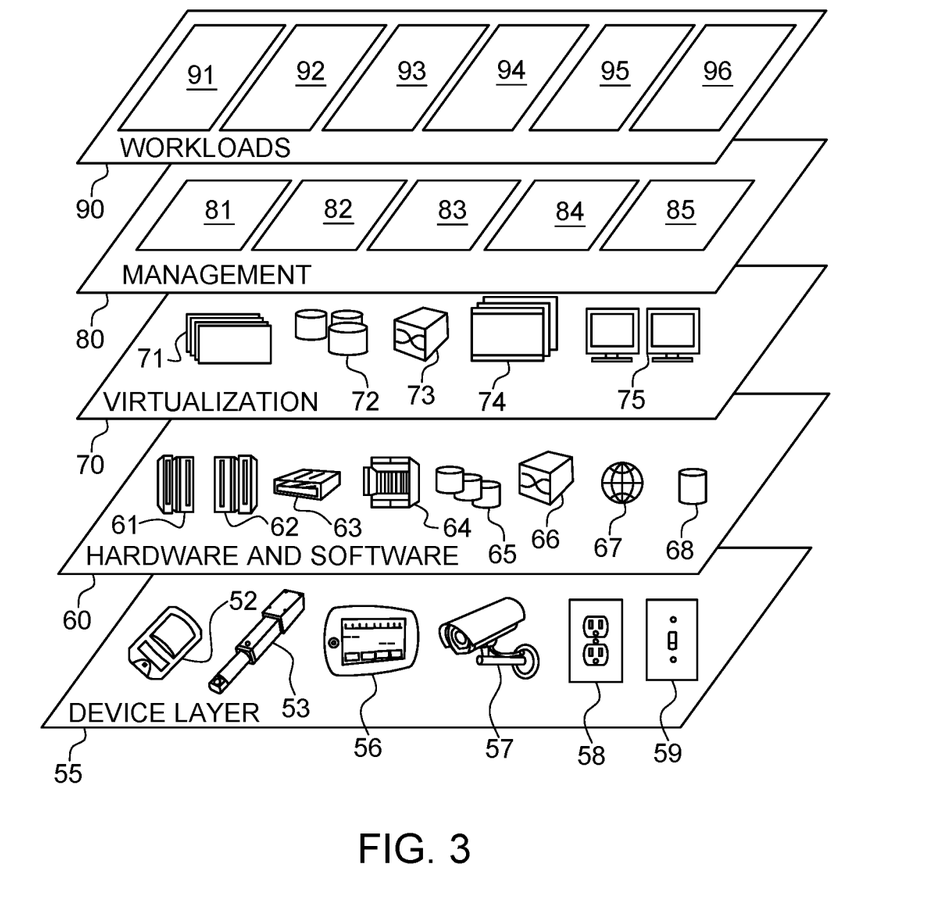
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing computing network (or system) security as described herein. One of ordinary skill in the art will appreciate that the workloads and functions 96 for managing computing network (or system) security may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for managing computing network security in which an authorized application's (and/or user's) behavior and/or activity is pre-defined and associated with the application so that security alerts attributed to the activity are ignored (and/or suppressed) for the authorized scope of operation (e.g., for only the authorized scope of operation).

In particular, in some embodiments, a method, by one or more processors, for managing computing network security is provided. A signal representative of authorized anomalous behavior is received. The signal includes at least one of an identity and a type of activity associated with the authorized anomalous behavior. A security incident is detected. If the detected security incident corresponds to the authorized anomalous behavior, the generating of an alert in response to the detecting of the security incident is suppressed. If the detected security incident does not correspond to the authorized anomalous behavior, an alert may be caused to be generated in response to the detecting of the security incident.

The signal may also include a time frame associated with the authorized anomalous behavior. If the detecting of the security incident occurs within the time frame, the generating of the alert may be suppressed. If the detecting of the security incident does not occur within the time frame, the alert may be caused to be generated.

The detecting of the security incident may include determining at least one of an identity and a type of activity associated with the detected security incident, and the at least one of the identity and the type of activity associated with the detected security incident may be compared to the at least one of the identity and the type of activity associated with the authorized anomalous behavior. The identity associated with the authorized anomalous behavior comprises at least one of an application name or identifier, a network address or identifier, or a combination thereof.

Figure 4:
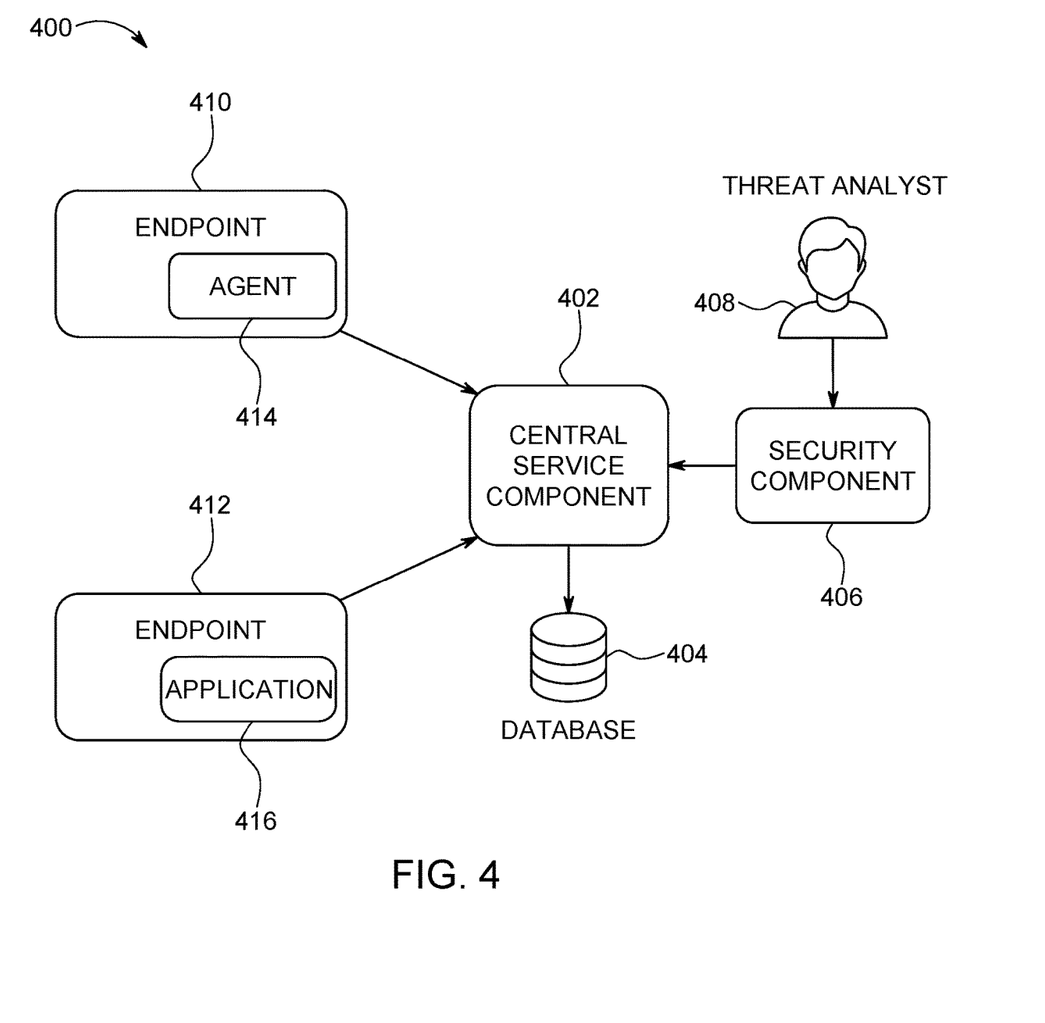
FIG. 4 is a block diagram example computing environment according to an embodiment of the present invention.

Referring now to FIG. 4, a simplified illustration of a computing environment (or network) 400, in accordance with some aspects of the present invention, is shown. The network 400 includes a central service component 402, a database 404, a security component (or sensor) 406 that is monitored by, for example, a threat analyst (or other personnel) 408, and endpoints 410 and 412 that include endpoint agent 414 and endpoint application 416, respectively. The central service component 402, the database 404, the security component 406, and the endpoints 410 and 412 may be implemented using and/or include any suitable computing device, such as those described above.

Still referring to the example shown in FIG. 4, the endpoint agent 414 within endpoint 410 and the endpoint application 416 within endpoint 412 generate and send signals to the central service component 402 when an authorized activity that may trigger security alerts (which can be ignored or suppressed) is scheduled and/or is about to be undertaken/performed (i.e., by endpoint 410 and/or 412, respectively). The signals may be representative of and/or describe authorized anomalous behavior and an associated metadata description. In some embodiments, the signals include an "identification" component (e.g., device or application name, network address, application name, user name, etc.) and a "behavior activity" component (e.g., describing the observable behavior associated with the activity that is to be performed). In some embodiments, the signals also include a "time" component, such as a time frame (or window) in which the activity will be performed (or at least initiated) and/or is authorized.

The central service component 402 receives the signals and stores them (and/or the included data/description/information) within database 404. In some embodiments, the central service component 402 may also compare the information received in the signals to a predefined list of authorized endpoints, devices, applications, etc. and activities associated therewith (i.e., a list of devices from which such signals are considered authorized and/or expected and/or a list of behaviors which are considered authorized and/or expected.). In the event that the signal is determined to be from an unauthorized endpoint, the signal may not be stored in the database and/or an appropriate security alert may be generated and/or sent to appropriate personnel.

When endpoint 410 and/or endpoint 412 initiates the activity in question, the action is detected by the security component 406 and/or the threat analyst 408 as a security incident (e.g., the detection of anomalous behavior by the security system). A security alert (or notification) may then be generated (or initiated) (e.g., by the security system). An inquiry regarding the detected activity is sent to the central service component 402, which searches the database 404 to determine if the manifested behavior of the specific application (or other entity) is authorized (perhaps at the specific time) to determine if the security alert is valid (and should be investigated and/or rectified) or pertains to authorized activity. That is, the database 404 is searched for a signal (and/or associated data) pertaining to the detected activity (e.g., the identity associated with the activity, the type of activity, the time at which the activity is being performed, and/or the type of security alert that is created).

If the detected activity is determined to be authorized (e.g., a signal regarding the activity was previously sent to the central service component 402 and/or stored on the database 404), the security alert is suppressed or ceased, or perhaps prevented from being generated altogether in some embodiments. If the detected activity is determined to be unauthorized (e.g., an appropriate, authorized signal regarding the activity was not previously sent to the central service component 402 and/or stored on the database 404), the security alert is allowed to continue and/or is not suppressed or cancelled (or in cases in which a security is not generated before the database 404 is searched for an appropriate signal, a security alert is then generated). In some embodiments (e.g., those utilizing the time component), if the activity in question is first detected (and/or initiated) within the indicated time frame but continues beyond the time frame indicated (i.e., after the time which the activity was to end), a security alert is generated. In situations in which a security alert is generated and/or not suppressed, a notification (e.g., a message) may be sent to appropriate personnel and/or systems so that the activity in question may be investigated and/or rectified.

As a simple example, a signal may be received (and/or generated) that indicates that port scanning warnings from a particular device can be safely ignored for the next 10 minutes. After such a signal is received, any security monitoring, control, or analytics system (or personnel) that detects a security alert on that device may query the central system (and/or the database) to determine whether or not that particular security alert can be safely ignored or suppressed. As a result, the likelihood that any resources will be wasted on investigating authorized activities is reduced, while minimizing any potential security "gaps."

In some embodiments, the methods (and/or systems) described herein may be considered to include a "preparation" phase and an "operational" phase. In some embodiments, during the preparation phase, authorized endpoints, which may generate authorized traffic which a security sensor may interpret as suspect, or which may express how another authorized endpoint may generate authorized traffic which a security sensor may interpret as suspect, may be identified and stored in a central service (or database). A network signature or manifestation (e.g., characteristics of network communication that allow an application, device, etc. generating the network traffic to be identified) for each of these authorized endpoints (and/or applications) may be identified and stored in the central service. For each authorized endpoint with an authorized application, the application is associated with the endpoint, the endpoint's network identity (e.g., IP address, host name, etc.), observable network signature/manifestation, and optionally, the time period the behavior/activity is acceptable, and this information is stored in the central service. If required, for each authorized endpoint, a "helper agent" of the application is placed on the endpoint. A helper agent may be an optional application component that facilitates communication between the application and another component/system (e.g., the central service) when, for example, the application does not otherwise have communication capability.

In some embodiments, during the operational phase, the methods described herein may be considered to include functionality performed by and/or associated with endpoints (or endpoint components), a central service (or central service component), and a security system (or security system component). With respect to the endpoint component, if the application (or a "helper agent," which acts on behalf of the application) is installed on an endpoint, and the application or agent is not known to the central service, the application or agent registers itself with the central service. If a change in application state is detected, the endpoint informs the central service of the endpoint's application operational state.

With respect to the central service component, in some embodiments, if an application (or helper agent) registration is requested or received, the central service processes the registration. If the application informs the central service of an operational state (or a change therein), the central service is updated with the current state of the application. If a security system query is received (e.g., whether or not a particular potential security threat should be ignored), the central service responds to the query. For example, if the behavior/attributes/characteristics of the anomalous network flow or activity (e.g., characteristics of a network communication that trigger an alert from a security system) is associated with an authorized application and the anomalous behavior is detected within the valid period and/or the anomalous behavior has been previously described as authorized behavior, the central service responds that the potential security threat can be ignored. Otherwise, the central service responds that the potential security threat should not be ignored.

With respect to the security system component, in some embodiments, if a security system identifies a suspicious network flow or activity, and if the source of the suspect flow/activity is from the identified collection of authorized endpoints, the security system queries the central service to determine if the anomalous behavior/attributes/characteristics of the network flow or activity associated with the collection of authorized endpoints, and potentially during an authorized time period, is an acceptable activity. If it is an acceptable activity (e.g., a "yes" response is received), the severity of the alert may be altered (e.g., reduced in severity or completely suppressed/cancelled or otherwise modified to reflect new information). If it is not an acceptable activity (e.g., a "no" response is received), a normal security alert is created or maintained.

In some embodiments, if the application (or its helper agent) is capable of confirming that it is the source of the activity at the particular time, the application is requested to do so. For example, the security system may query the central service to obtain a contact method (including both identity and credentials) for the application (or its helper agent). The security system may then contact the application (or its helper agent) to determine if the application is active. If the application is not active, then the alert(s) is not modified.

As will be appreciated by one skilled in the art, the alteration of alert severity may be based on an absolute rule, a rule based on endpoint, or application or time of day or other parameters. The severity alteration rule may be contained either in the central service or in the security system itself.

It should be noted that in at least some of the embodiments described herein (e.g., such as some of those described above), an endpoint component informs a central service that an application is beginning (or is about to begin) authorized activities that will (or at least may) result in a security alert (which should be ignored). However, in some embodiments, the application does not inform the central service. In such embodiments, the time period in which the authorized application initiates the authorized anomalous behavior may be defined in the preparation phase. This may allow embodiments described herein to be applied without modification to any application.

In such embodiments, during the operational phase, with respect to the central service component, if a security system query is received, the central service responds to the query. If the behavior/attributes/characteristics of the network flow or activity associated with the authorized application (at the particular time) is an acceptable activity, central service responds with "yes" (i.e., the potential security threat should be ignored). Otherwise, the central service responds with "no" (i.e., the potential security threat should not be ignored).

With respect to the security system component, if the security system identifies a suspect network flow or activity and the source of the suspicious flow/activity is from the identified collection of authorized endpoints, the security system queries the central service to determine if the anomalous behavior/attributes/characteristics of the network flow or activity associated with the authorized application (at the particular time) is an acceptable activity. If it is an acceptable activity (e.g., a "yes" response is received), the severity of the alert may be altered (e.g., reduced in severity or completely suppressed/cancelled). If it is not an acceptable activity (e.g., a "no" response is received), a normal security alert is created or maintained.

Embodiments described herein may be applied, for example, to reduce costs in responding to security incidents in cloud based services. That is, because of the dynamic nature of cloud based servers, determining if a server instance is authorized to generate suspect traffic at the time of a security alert can be very time consuming, expensive, and tie up valuable incident response resources. An example would be a vulnerability scanner instance being created in the cloud to perform authorized vulnerability scanning.

In such an example, in an initial or preparation phase, a security administrator, through, for example, a central service (e.g., central service component 402 in FIG. 4), identifies the vulnerability scanner application as an authorized service and/or identity on the network, identifies the network signature or manifestation that the scanner application will present, and identifies the time period (or time frame) that this scanner application will exhibit (or perform) the scanning. During an operational phase, the vulnerability scanner (or a helper agent thereof) informs the central service (e.g., via a signal) that it is about to start a vulnerability scan and presents its identity as defined in the preparation phase. In some embodiments, the network security controls (or system) begin to trigger a security alert as the anomalous network traffic (i.e., a potential security threat) is observed. The security controls then query the central service to determine if the observed anomalous network traffic is anticipated, if the source of the anomalous network traffic is anticipated, and if the time at which the anomalous network traffic was observed (or initiated) is anticipated. In other words, the security controls determine whether or not a signal corresponding to the observed activity was previously received by the central service. In this case, because the information from the central service matches (or corresponds to) the activity observed by the security controls, the security alert is suppressed. However, in the event that no such matching information (or signal) was found, the security alert is not suppressed (or modified).

As another example, embodiments described herein may be applied to provide improved security of workstation endpoints by dynamically tracking the current state of authorized endpoints performing, for example, network scanning at specific times. For example, if a particular user needs to perform an authorized network application scan that will take two hours, embodiments described herein may facilitate tracking the authorization, allowing for the corresponding security alert to be ignored (or suppressed) for only the specific time frame indicated. If the same workstation generates suspicious network traffic outside of the authorized time frame, the activity may be identified as a potential security threat. In contrast, a traditional whitelisting approach may not generate a security alert in such a situation.

In such an example, in a preparation phase, a security administrator, through, for example, a central service, identifies or defines the set of endpoints that are authorized to perform network scanning and registers the endpoints as authorized services and/or identities on the network. During an operational phase, the administrator requests a time period for the appropriate endpoint(s) (e.g., via a signal) from the central service. The central service checks to see if the endpoint(s) is authorized (from the list created during the preparation phase), and if so, the central service logs the time request for the authorized endpoint(s). In some embodiments, the network security controls (or system) begin to trigger a security alert as the anomalous network traffic (i.e., a potential security threat) is observed. The security controls then query the central service to determine if the observed anomalous network traffic is anticipated, if the source of the anomalous network traffic is anticipated, and if the time at which the anomalous network traffic was observed (or initiated) is anticipated. In other words, the security controls determine whether or not a signal corresponding to the observed activity was previously described to central service. In this case, because the information from the central service matches (or corresponds to) the activity observed by the security controls, the security alert is suppressed. However, in the event that no such matching information (or signal) was found, the security alert is not suppressed.

Figure 5:
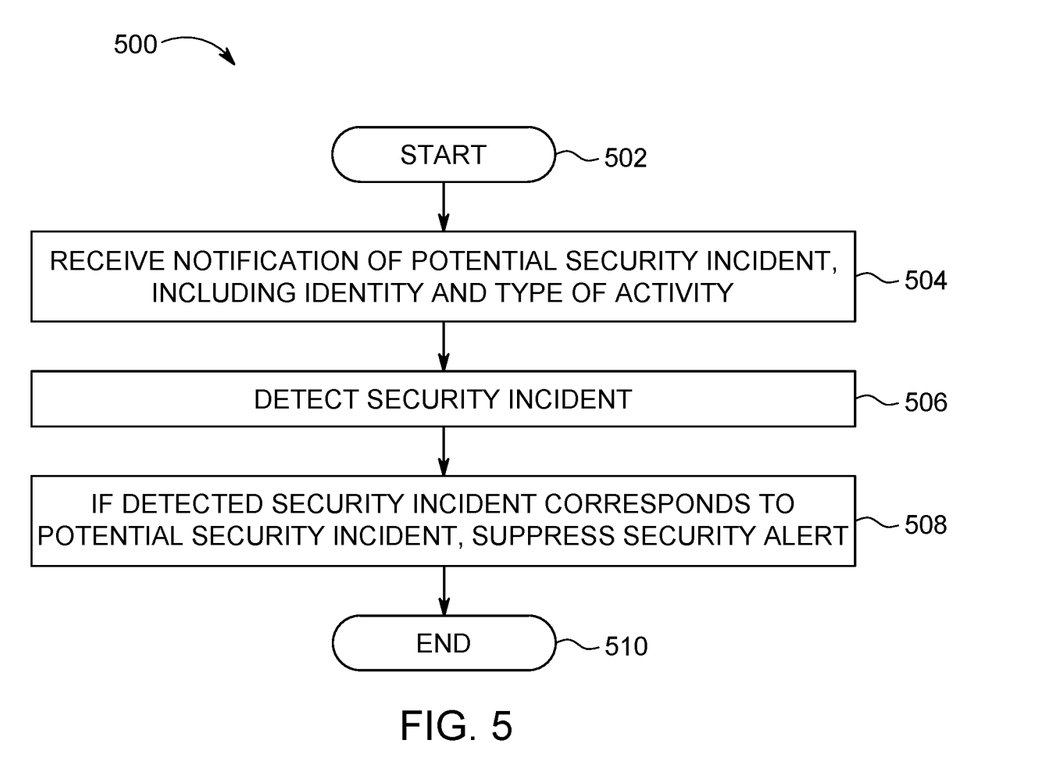
FIG. 5 is a flowchart diagram of an exemplary method for managing computing network security according to an embodiment of the present invention.

Turning to FIG. 5, a flowchart diagram of an exemplary method 500 for managing computing network security, in accordance with various aspects of the present invention, is provided. Method 500 begins (step 502) with, for example, authorized endpoints (or computing devices, users, etc.), which may generate authorized traffic which a security sensor may interpret as suspect, being identified and stored in a central service (or database).

A signal is received (step 504). The signal is representative (or a representation) of and/or describes authorized anomalous behavior which may be observed and interpreted by security controls as a potential security incident and includes any appropriate metadata with respect to the authorized anomalous behavior (e.g., behavior, attributes, characteristics, the time period the anomalous behavior may occur, etc.). For example, the signal may include (and/or describe) at least one of an identity and a type of activity associated with the authorized anomalous behavior. The identity associated with the potential security incident may include, for example, an application name or a network address (or any other appropriate form of identification described above). The signal may also include a time frame associated with the potential security threat.

A security incident is detected (step 506). The detecting of the security incident may include determining an identity and/or a type of activity associated with the detected security incident.

If the detected security incident corresponds to the authorized anomalous behavior (as described by the signal), the generating of an alert in response to the detecting of the security incident is suppressed (step 508). If the detected security incident does not correspond to the authorized anomalous behavior, an alert may be caused to be generated in response to the detecting of the security incident. If the detecting of the security incident occurs within the time frame (if described by the signal), the generating of the alert may be suppressed. If the detecting of the security incident does not occur within the time frame, the alert may be caused to be generated. The identity and type of activity associated with the detected security incident may be compared to the identity and type of activity associated with the authorized anomalous behavior. Method 500 ends (step 510) with, for example, appropriate security personnel (and/or systems) investigating and/or rectifying the security incident in the event the alert is not suppressed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing computing network security comprising:
    identifying a network signature of an endpoint having an authorized application executing thereon, wherein the authorized application is associated with an identity of the endpoint inclusive of the network signature;
    registering, in a database, the network signature, the identity of the endpoint, and information of the authorized application, wherein the information is inclusive of a current operational state of the authorized application, and wherein, when the authorized application lacks communication ability with the database, a helper agent is deployed on the endpoint to facilitate communication between the authorized application and the database;
    receiving, by the database, a signal representative of authorized anomalous behavior transmitted by the endpoint, wherein the signal comprises descriptive information including the identity and a type of activity associated with the authorized anomalous behavior;
    detecting the security incident within the endpoint, wherein the detecting of the security incident includes determining an identity and a type of activity associated with the detected security incident;
    responsive to detecting the security incident, initiating generating of an alert corresponding to the detected security incident;
    responsive to generating the alert, comparing, by referencing the database, the identity and the type of activity associated with the detected security incident to the identity and the type of activity associated with the authorized anomalous behavior; and
    when the detected security incident corresponds to the authorized anomalous behavior according to the comparison, suppressing a presentation of the generated alert.

2. The method of claim 1, further comprising, when the detected security incident does not correspond to the authorized anomalous behavior, causing the alert to be presented in response to the detecting of the security incident.

3. The method of claim 1, wherein the signal further includes a time frame associated with the authorized anomalous behavior.

4. The method of claim 3, further comprising, when the detecting of the security incident occurs within the time frame, suppressing the presentation of the alert.

5. The method of claim 4, further comprising, when the detecting of the security incident does not occur within the time frame, causing the alert to be presented.

6. The method of claim 1, wherein the identity associated with the authorized anomalous behavior comprises at least one of an application name or identifier, a network address or identifier, or a combination thereof.

7. A system for managing computing network security comprising:
  at least one hardware processor that
    identifies a network signature of an endpoint having an authorized application executing thereon, wherein the authorized application is associated with an identity of the endpoint inclusive of the network signature;
    registers, in a database, the network signature, the identity of the endpoint, and information of the authorized application, wherein the information is inclusive of a current operational state of the authorized application, and wherein, when the authorized application lacks communication ability with the database, a helper agent is deployed on the endpoint to facilitate communication between the authorized application and the database;
    receives, by the database, a signal representative of authorized anomalous behavior transmitted by the endpoint, wherein the signal comprises descriptive information including the identity and a type of activity associated with the authorized anomalous behavior;
    detects the security incident within the endpoint, wherein the detecting of the security incident includes determining an identity and a type of activity associated with the detected security incident;
    responsive to detecting the security incident, initiates generating of an alert corresponding to the detected security incident;
    responsive to generating the alert, compares, by referencing the database, the identity and the type of activity associated with the detected security incident to the identity and the type of activity associated with the authorized anomalous behavior; and
    when the detected security incident corresponds to the authorized anomalous behavior according to the comparison, suppresses a presentation of the generated alert.

8. The system of claim 7, wherein the at least one hardware processor further, when the detected security incident does not correspond to the authorized anomalous behavior, causes the alert to be presented in response to the detecting of the security incident.

9. The system of claim 7, wherein the signal further includes a time frame associated with the authorized anomalous behavior.

10. The system of claim 9, wherein the at least one hardware processor further, when the detecting of the security incident occurs within the time frame, suppresses the presentation of the alert.

11. The system of claim 10, wherein the at least one hardware processor further, when the detecting of the security incident does not occur within the time frame, causes the alert to be presented.

12. The system of claim 7, wherein the identity associated with the authorized anomalous behavior comprises at least one of an application name or identifier, a network address or identifier, or a combination thereof.

13. A non-transitory computer program product for managing computing network security by one or more processors, the computer program product comprising a non-transitory computer-readable storage medium having computer-readable program code portions stored therein, the computer-readable program code portions comprising:
  an executable portion that identifies a network signature of an endpoint having an authorized application executing thereon, wherein the authorized application is associated with an identity of the endpoint inclusive of the network signature;
  an executable portion that registers, in a database, the network signature, the identity of the endpoint, and information of the authorized application, wherein the information is inclusive of a current operational state of the authorized application, and wherein, when the authorized application lacks communication ability with the database, a helper agent is deployed on the endpoint to facilitate communication between the authorized application and the database;
  an executable portion that receives, by the database, a signal representative of authorized anomalous behavior transmitted by the endpoint, wherein the signal comprises descriptive information including the identity and a type of activity associated with the authorized anomalous behavior;
  an executable portion that detects the security incident within the endpoint, wherein the detecting of the security incident includes determining an identity and a type of activity associated with the detected security incident;
  an executable portion that, responsive to detecting the security incident, initiates generating of an alert corresponding to the detected security incident;
  an executable portion that, responsive to generating the alert, compares, by referencing the database, the identity and the type of activity associated with the detected security incident to the identity and the type of activity associated with the authorized anomalous behavior; and
  an executable portion that, when the detected security incident corresponds to the authorized anomalous behavior according to the comparison, suppresses a presentation of the generated alert.

14. The non-transitory computer program product of claim 13, wherein the computer-readable program code portions further include an executable portion that, when the detected security incident does not correspond to the authorized anomalous behavior, causes the alert to be presented in response to the detecting of the security incident.

15. The non-transitory computer program product of claim 13, wherein the signal further includes a time frame associated with the authorized anomalous behavior.

16. The non-transitory computer program product of claim 15, wherein the computer-readable program code portions further include an executable portion that, when the detecting of the security incident occurs within the time frame, suppresses the presentation of the alert.

17. The non-transitory computer program product of claim 16, wherein the computer-readable program code portions further include an executable portion that, when the detecting of the security incident does not occur within the time frame, causes the alert to be presented.

18. The non-transitory computer program product of claim 13, wherein the identity associated with the authorized anomalous behavior comprises at least one of an application name or identifier, a network address or identifier, or a combination thereof.

* * * * *

UNITED STATES PATENT AND TRADEMARK OFFICE
CERTIFICATE OF CORRECTION

| | | |
|---|---|---|
| PATENT NO. | : 11,050,780 B2 | Page 1 of 1 |
| APPLICATION NO. | : 15/833447 | |
| DATED | : June 29, 2021 | |
| INVENTOR(S) | : Lingafelt et al. | |

It is certified that error appears in the above-identified patent and that said Letters Patent is hereby corrected as shown below:

On the Title Page (72) Inventors: should read as follows:
Charles Steven Lingafelt, Durham, NC (US);
Suzanne C. Deffeyes, Weaverville, NC (US);
Gary K. Thornton, Carrollton, TX (US);
Amir Khan, Brookfield, CT (US);

Signed and Sealed this
Seventeenth Day of December, 2024

Derrick Brent
*Acting Director of the United States Patent and Trademark Office*